US008685225B2

(12) United States Patent
Shindo et al.

(10) Patent No.: US 8,685,225 B2
(45) Date of Patent: *Apr. 1, 2014

(54) METHOD OF RECOVERING VALUABLE METAL FROM SCRAP CONDUCTIVE OXIDE

(75) Inventors: Yuichiro Shindo, Ibaraki (JP); Kouichi Takemoto, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 763 days.

This patent is subject to a terminal disclaimer.

(21) Appl. No.: 12/524,947

(22) PCT Filed: Feb. 8, 2008

(86) PCT No.: PCT/JP2008/052107
§ 371 (c)(1),
(2), (4) Date: Jul. 29, 2009

(87) PCT Pub. No.: WO2008/099773
PCT Pub. Date: Aug. 21, 2008

(65) Prior Publication Data
US 2010/0101963 A1 Apr. 29, 2010

(30) Foreign Application Priority Data

Feb. 16, 2007 (JP) ................. 2007-036491
Jun. 27, 2007 (JP) ............ PCT/JP2007/062900

(51) Int. Cl.
C25F 1/04 (2006.01)
(52) U.S. Cl.
USPC ........... 205/704; 205/705; 205/710; 205/711; 205/719
(58) Field of Classification Search
USPC ................ 205/704, 705, 710, 711, 719
See application file for complete search history.

(56) References Cited

U.S. PATENT DOCUMENTS

| 2,915,444 | A | * | 12/1959 | Meyer | ............... | 205/711 |
|---|---|---|---|---|---|---|
| 3,257,299 | A | * | 6/1966 | Mekjean | ............... | 205/710 |
| 4,330,377 | A | | 5/1982 | Franks, Jr. | | |
| 5,290,412 | A | | 3/1994 | Saito et al. | | |
| 5,417,816 | A | | 5/1995 | Nakashima et al. | | |
| 6,896,788 | B2 | | 5/2005 | Shindo et al. | | |
| 7,435,325 | B2 | | 10/2008 | Shindo et al. | | |
| 8,003,065 | B2 | | 8/2011 | Shindo et al. | | |
| 8,007,652 | B2 | | 8/2011 | Shindo et al. | | |
| 8,012,335 | B2 | | 9/2011 | Shindo et al. | | |
| 8,012,336 | B2 | | 9/2011 | Shindo et al. | | |
| 8,012,337 | B2 | | 9/2011 | Shindo et al. | | |
| 8,308,932 | B2 | * | 11/2012 | Shindo et al. | ............... | 205/564 |
| 8,308,933 | B2 | * | 11/2012 | Shindo et al. | ............... | 205/564 |
| 8,308,934 | B2 | * | 11/2012 | Shindo et al. | ............... | 205/564 |
| 2009/0004498 | A1 | | 1/2009 | Shindo et al. | | |
| 2010/0072075 | A1 | | 3/2010 | Shindo et al. | | |
| 2010/0084279 | A1 | | 4/2010 | Shindo et al. | | |
| 2010/0084281 | A1 | | 4/2010 | Shindo et al. | | |
| 2010/0101963 | A1 | | 4/2010 | Shindo et al. | | |
| 2010/0101964 | A1 | | 4/2010 | Shindo et al. | | |
| 2010/0282615 | A1 | | 11/2010 | Shindo et al. | | |
| 2010/0288645 | A1 | | 11/2010 | Shindo et al. | | |
| 2010/0288646 | A1 | | 11/2010 | Shindo et al. | | |

FOREIGN PATENT DOCUMENTS

| JP | 07-145432 A | 6/1995 |
|---|---|---|
| JP | 2003-247089 A | 9/2003 |
| JP | 2005-314786 A | 11/2005 |

OTHER PUBLICATIONS

One page English language Abstract of JP 62-290900 A, Dec. 17, 1987.
One page English language Abstract of JP 08-041560 A, Feb. 13, 1996.
One page English language Abstract of Jp 03-082720 A, Apr. 8, 1991.
One page English language Abstract of JP 2000-169991 A, Jun. 20, 2000.
One page English language Abstract of JP 2002-069684 A, Mar. 8, 2002.
One page English language Abstract of JP 2002-069544 A, Mar. 8, 2002.
One page English language Abstract of JP 2002-241865 A, Aug. 28, 2002.
One page English language Abstract of JP 63-274725 A, Nov. 11, 1988.

* cited by examiner

Primary Examiner — Arun S Phasge
(74) Attorney, Agent, or Firm — Howson & Howson LLP

(57) ABSTRACT

Proposed is a method of recovering valuable metal from scrap containing conductive oxide including the steps of using scrap containing conductive oxide and performing electrolysis while periodically inverting the polarity, and recovering the scrap as hydroxide. With the foregoing method of recovering valuable metal from scrap containing conductive oxide, oxide system scrap is conductive oxide and a substance that can be reduced to metal or suboxide with hydrogen. This method enables to efficiently recover valuable metal from sputtering target scrap containing conductive oxide or scrap such as mill ends of conductive oxide that arise during the production of such a sputtering target.

7 Claims, No Drawings

METHOD OF RECOVERING VALUABLE METAL FROM SCRAP CONDUCTIVE OXIDE

BACKGROUND OF THE INVENTION

The present invention relates to a method of recovering valuable metal from scrap containing conductive oxide as represented by an ITO scrap of a spent indium-tin oxide (ITO) sputtering target or an ITO scrap such as ITO mill ends (hereinafter collectively referred to as "scrap containing conductive oxide" in this specification). Incidentally, the phrase "recovery of valuable metal" as used herein shall include compounds of oxides and hydroxides having valuable metal as its component.

In recent years, an indium-tin oxide ($In_2O_3$—$SnO_2$: generally known as ITO) sputtering target is being widely used in numerous electronic components; for instance, for a transparent conductive thin film of an LCD device or a gas sensor. In many cases, however, it is used as a result of a thin film being formed on a substrate or the like by employing the sputtering method as the thin film forming means. ITO is a representative oxide with conductive property.

Oxide with conductive property (conductive oxide) is not limited to ITO, and there are numerous conductive oxides including IGZO (In—Ga—Zn—O composite oxide), ZnO, Zn—$SnO_2$, $SnO_2$, Co—In—O composite oxide, Ni—Sn—O composite oxide, Cu—Ga—O composite oxide, Pb—Sn—O composite oxide, Cd—Zn—O composite oxide, Ca—Gu—O composite oxide, Sb—In—O composite oxide, Fe—Ge—O composite oxide, Pb—Sn—O composite oxide, Ti—In—O composite oxide, and the like. These composite oxides are similarly used for preparing a target, sputtering the target to form a thin film, and thereby used in various electronic components.

It is true that the sputtering method as the thin film forming means is superior, but when a sputtering target is used to form a transparent conductive thin film or the like, the target will not be consumed uniformly. A portion of the target with severe consumption is generally referred to as an eroded portion, and the sputtering operation is continued until immediately before a backing plate supporting the target becomes exposed due to the further consumption of the eroded portion. This target is subsequently replaced with a new target.

Accordingly, a spent sputtering target will have numerous non-eroded portions, that is, unused portions of the target and all of these portions become scrap. Moreover, even during the production of a sputtering target formed from such conductive oxides, scraps (mill ends) will arise from abrasive powder, cutting powder and the like.

High purity materials are used as the sputtering target material formed from the foregoing conductive oxides and, since all of these materials are expensive, the process of recovering raw materials from scrap materials is being generally performed. As this kind of high purity material recovery method, conventionally, a method that combines wet refining such as the acid solution process, ion exchange method, and solvent extraction method has been used.

For instance, there is a method of subjecting an ITO scrap to cleansing and pulverization, thereafter dissolving this in hydrochloric acid, precipitating and eliminating impurities such as zinc, tin, lead and copper as sulfide by passing hydrogen sulfide through the solution, thereafter adding ammonia to neutralize the solution, and recovering the resulting indium hydroxide.

Nevertheless, the indium hydroxide obtained with the foregoing method has inferior filtration property, requires long operational process, and contains large amounts of impurities such as Si and Al. In addition, with the created indium hydroxide, since the grain size and grain size distribution will vary depending on the neutralization condition, maturization condition and other conditions, there is a problem in that the characteristics of the ITO target cannot be stably maintained upon subsequently manufacturing such ITO target. The same applies to other conductive oxides.

Conventional technology and its advantages and disadvantages are described below.

As one example of such conventional technology, there is an etching method of a transparent conductive film including the steps of reducing an ITO film deposited on a substrate based on an electrochemical reaction in the electrolyte, and dissolving the reduced transparent conductive film in the electrolyte (refer to Patent Document 1). However, the object of this method is to obtain a mask pattern with high precision, and relates to technology that is different from the recovery method.

There is also technology of separating, in the electrolyte, the impurities contained in an In brazing filler material used in the bonding with the backing plate as pretreatment for recovering valuable metal from ITO (refer to Patent Document 2). Nevertheless, this method does not relate to technology of directly recovering valuable metal from ITO.

Moreover, upon recovering indium from an intermediate obtained as a by-product of the zinc refining process or an ITO scrap, disclosed is technology of separating tin as halogenated stannate, performing reduction treatment with hydrochloric acid or a nitric acid solution, subsequently adjusting the pH of this aqueous solution to 2 to 5, reducing metallic ions of iron, zinc, copper, thallium and the like in order to obtain a substance that will not precipitate easily, and separating the indium component in the aqueous solution (refer to Patent Document 3). With this technology, however, there is a problem in that the refining process is complicated, and a superior refining effect cannot be expected.

Further, as a method of recovering high purity indium, disclosed is technology of dissolving ITO in hydrochloric acid, adding alkali thereto to make the pH 0.5 to 4, eliminating tin as hydroxide, subsequently blowing hydrogen sulfide gas in order to eliminate hazardous materials such as copper and lead as sulfide, and electrowinning indium metal by performing electrolysis using the obtained solution (refer to Patent Document 4). There is a problem with this technology in that the refining process is complicated.

In addition, proposed is a method of dissolving an ITO indium-containing scrap in hydrochloric acid to obtain an indium chloride solution, adding a sodium hydroxide solution to this solution to eliminate tin as tin hydroxide, additionally adding a sodium hydroxide solution after the elimination to obtain indium hydroxide, filtering the obtained indium hydroxide, obtaining indium sulfate from the filtered indium hydroxide, and obtaining indium by electrowinning the indium sulfate (refer to Patent Document 5). Although this is an effective method with a significant refining effect, there is a drawback in that the process is complicated.

Also proposed is a method of recovering indium including the steps of dissolving an ITO indium-containing scrap in hydrochloric acid to obtain an indium chloride solution, adding a sodium hydroxide solution to the indium chloride solution to eliminate tin contained in the scrap as tin hydroxide, substituting indium with zinc from the solution after eliminating the tin hydroxide, and thereafter recovering indium (refer to Patent Document 6). Although this is also an effective method with a significant refining effect, there is a drawback in that the process is complicated.

Additionally disclosed is a method of recovering metallic indium including the steps of extracting suboxide-containing cast scrap floating on molten metal indium and introducing this into an atmosphere furnace, vacuating the furnace once, thereafter introducing argon gas, heating the furnace to a prescribed temperature and reducing the suboxide-containing cast scrap (refer to Patent Document 7).

Although this is in itself an effective method, there is a drawback in that this is not a fundamental recovery method of conductive oxide.

In light of the above, a method that is efficient with a versatile recovery process is being sought.

[Patent Document 1] Japanese Patent Laid-Open Publication No. S62-290900
[Patent Document 2] Japanese Patent Laid-Open Publication No. H8-41560
[Patent Document 3] Japanese Patent Laid-Open Publication No. H3-82720
[Patent Document 4] Japanese Patent Laid-Open Publication No. 2000-169991
[Patent Document 5] Japanese Patent Laid-Open Publication No. 2002-69684
[Patent Document 6] Japanese Patent Laid-Open Publication No. 2002-69544
[Patent Document 7] Japanese Patent Laid-Open Publication No. 2002-241865

SUMMARY OF THE INVENTION

In order to overcome the foregoing problems, the present invention provides a method of efficiently recovering valuable metal from a sputtering target scrap containing conductive oxide or a scrap such as mill ends arose during the manufacture of such sputtering target.

The present invention provides a method of recovering valuable metal from scrap containing conductive oxide by subjecting the scrap containing conductive oxide to electrolysis in pH-adjusted electrolyte, and thereby recovering valuable metal as hydroxide. Here, the present invention can be applied to all oxides as long as it is a conductive oxide and, regardless of the level of conductive property, contains an element that can be reduced to metal or suboxide with hydrogen.

The method of recovering valuable metal from scrap containing conductive oxide according to the present invention has a significant feature of using scrap containing conductive oxide for both the anode and cathode. In this case, electrolysis is performed by periodically inverting the polarity of both the anode and cathode; that is, electrolysis is performed by alternately changing the polarity periodically (mutual inversion of anode polarity ↔ cathode polarity). It is thereby possible to efficiently recover the scrap as hydroxide.

No such technology existed conventionally, nor is there any document that suggests this kind of method. Thus, the method of recovering valuable metal from scrap containing conductive oxide according to the present invention is a basic invention.

Since scrap containing conductive oxide is an oxide system ceramic, it would not be possible to envisage recovering valuable metal with the electrolytic method, under normal conditions. Nevertheless, the substance itself to be recovered in the present invention possesses conductive property even though it is an oxide system ceramic. The present invention focused attention on this point and attempted to recover valuable metal with electrolysis, and succeeded.

It is well known that the foregoing substances including ITO possess conductive property. Taking ITO as an example, this is considered to be a result of the oxygen defect of ITO as the sintered compact of tin oxide ($SnO_2$) and indium oxide ($In_2O_3$). The same applies to the other conductive oxides described above.

The present invention utilizes the conductive property of the substance itself. Nevertheless, it should be understood that the knowledge and judgment that the recovery of valuable metal based on electrolysis utilizing the conductive property inherent to substances such as ITO could only be realized through the implementation of numerous experiments.

For example, with a conventional method of recovering valuable metal from scrap containing conductive oxide such as ITO, a plurality of processing steps are combined such as pulverizing the scrap and dissolving it in strong acid, and then subjecting it to reduction, substitution, sulfurization, precipitation, neutralization, filtration, solvent extraction, ion exchange, casting and so on.

The problem during the foregoing processing steps is the inclusion of impurities during the pulverization process of the scrap containing conductive oxide, and, since it will be necessary to eliminate the impurities in during the pulverization process at the subsequent processing steps, the overall process will become more complicated.

Thus, it should be easy to understand that directly recovering valuable metal from scrap containing conductive oxide based on electrolysis yields a highly significant advantage.

With the method of recovering valuable metal from scrap containing conductive oxide according to the present invention, it is desirable to invert the polarity of the anode and cathode at the time the voltage during the electrolysis rises to a certain level or higher. As described later, the conversion of polarity of the anode and cathode is a means for improving the recovery efficiency, and the voltage is used as the index thereof. Thus, the timing of inverting the polarity can be set according to the detection of the rise in voltage.

Generally, since the constantly optimal condition for the timing of inversion can be understood if the equipment is fixed, the polarity may also be inverted at certain timing. Accordingly, the timing of inverting the polarity of the anode and cathode polarity can be controlled arbitrarily, and it should be easily understood that such timing of inversion is not bound by the foregoing conditions.

Moreover, during the foregoing electrolysis, it is preferable to invert the polarity of the anode and cathode in 1 minute to 10 minute cycles. However, the timing of inverting the polarity is also a condition that may be arbitrarily changed according to the capacity of the electrolytic bath, amount of scrap containing conductive oxide, current density, voltage, current, type of electrolyte and so on. The foregoing conditions merely show the preferable conditions, and it should be easily understood that the timing of inversion is not bound by the foregoing conditions either.

Upon recovering valuable metal from scrap containing conductive oxide according to the present invention, electrolysis is performed using neutral electrolyte, and the scrap is recovered as hydroxide. For example, in the case of an ITO scrap as the representative scrap, it is desirable to adjust the pH of the initial electrolyte to be 2 to 12. This is a preferable condition for efficiently recovering the scrap as hydroxide. Nevertheless, one reason that it is not necessary to limit the value to the foregoing range is that other substances (scraps) have different ranges in which hydroxide is created depending on the type of such substance (scrap).

As the electrolyte, it is desirable to select a solution that does not emit hazardous gases, and a material that will not be contained as an impurity in the substance upon recovering the scrap as hydroxide. In light of the above, a solution of sodium sulfate, sodium chloride, sodium nitrate, ammonium sulfate, ammonium chloride, ammonium nitrate, potassium chloride, potassium nitrate, potassium sulfate and the like may be arbitrarily selected and used.

Nevertheless, as long as it is a solution that gives consideration to the production efficiency and can be used for subjecting the scrap containing conductive oxide to electrolysis, it should be understood that solutions other than those indicated above may also be used as the electrolyte. The selection of a solution as the electrolyte can be made arbitrarily as long as the solution satisfies the conditions for subjecting the scrap containing conductive oxide to electrolysis, and obviously, such selection is not the essence of the present invention.

In the recovery of valuable metal from scrap containing conductive oxide, the present invention has achieved its object by recovering the hydroxide obtained from the electrolysis. However, it is also possible to roast the indium hydroxide to obtain indium oxide and tin oxide, and recover the scrap as a mixture of such indium oxide and tin oxide.

As described above, if hydroxide can be once recovered from scrap containing conductive oxide, it will be possible to roast this to obtain metal oxide or a mixture of two or more types of metal oxides, and use this as is as the raw material of conductive oxide. Further, as needed, other metals or oxides may be added to change the component amount, and it would be easy to sinter this and recycle it as a new conductive oxide target. The present invention covers all of the foregoing aspects.

In addition, it is also possible to subject the hydroxide obtained from the foregoing electrolysis to acid leaching in order to obtain a metallic solution, and adjust the pH and separate this solution to extract the respective metals.

As described above, the recovery of valuable metal from scrap containing conductive oxide according to the present invention is able to maintain the purity without change if the scrap containing conductive oxide to be subject to electrolysis is in itself scrap of a high purity material, and the scrap can be recovered as high purity hydroxide.

It is obvious that this is a significant advantage of the present invention. The present invention yields superior effects of saving complicated processes and the process of eliminating impurities mixed in during production in the past, enabling to improve the production efficiency and recover high purity valuable metal.

The electrolytic condition such as the current density and the like is not uniformly decided since the subject is scrap such as mill ends, and the current density is suitably selected and implemented according to the amount of mill ends and the quality of material. The liquid temperature of the electrolyte solution is set to a range of 0 to 100° C., generally, but room temperature (15 to 30° C.) will suffice.

The method provided by the present invention is superior, since recovering valuable metal from scrap containing conductive oxide, such scraps as a sputtering target scrap containing conductive oxide or a scrap as mill ends of conductive oxide that arise during the production of such a sputtering target is simply subject to electrolysis as the anode and cathode, it is very easy to obtain hydroxide and efficiently recover the same. Moreover, the recovery of valuable metal from scrap containing conductive oxide according to the present invention enables to maintain the purity without change if the scrap containing conductive oxide to be subject to electrolysis is in itself scrap of a high purity material, and the scrap can be recovered as high purity hydroxide. This is a significant advantage of the present invention. The present invention yields superior effects of saving complicated processes and the process of eliminating impurities mixed in during production as in the past, enabling to increase the production efficiency and recover high purity valuable metal.

DETAILED DESCRIPTION OF THE INVENTION

The present invention enables to recover scrap containing valuable metal easily, which contains conductive oxide, as hydroxide based on electrolysis. By additionally roasting the obtained hydroxide, the scrap can be efficiently recovered as various metal oxides or a mixture thereof.

The roasting temperature is set to 100 to 1000° C., preferably 100 to 500° C. Moisture will remain if the roasting temperature is less than 100° C. and sintering will occur if the roasting temperature is higher than 1000° C. Thus, the roasting temperature is set to be within the foregoing range.

As the electrolyte, such a solution as sodium sulfate, sodium chloride, sodium nitrate, ammonium sulfate, ammonium chloride, ammonium nitrate, potassium chloride, potassium nitrate, potassium sulfate may be arbitrarily selected and used.

Caution is necessary in the processing since chlorine gas will be generated pursuant to the passivation of the anode if the anion is a chlorine anion, and since nitric oxide gas will be generated pursuant to the passivation of the anode if the anion is a nitric acid anion and there will a nitrogen load of the discharged water.

Since a sulfuric acid system hardly entails the foregoing problems, a sulfuric acid solution would be a suitable material. Also, there is no reason that other electrolytes cannot be used as long as the foregoing problems can be overcome.

In addition, it is also possible to use a publicly-known additive agent in order to improve the current efficiency. As described above, if oxides of two or more types of constituent elements can be simultaneously recovered, it should be understood that it is also easy to produce recycled conductive oxide.

A special electrolytic apparatus is not required. For instance, the scrap containing conductive oxide to be subject to electrolysis is used as the anode and cathode. It is thereby possible to avoid the increase or inclusion of impurities initially contained in the scrap containing conductive oxide.

It is desirable to adjust the electrolytic condition as needed according to the type of raw material. The only factor to be adjusted in this case is the production efficiency. Generally, better productivity can be attained through electrolysis with a large current and high voltage. Nevertheless, there is no need to limit the conditions to the foregoing conditions, and such conditions may be arbitrarily selected.

Further, although there is no particular limitation on the electrolysis temperature, it is desirable to perform electrolysis upon adjusting the temperature to 0 to 100° C. Electrolysis can be sufficiently performed at room temperature. Scraps such as mill ends may be respectively placed in an anode box (basket) or a cathode box (basket) for the electrolysis. If a scrap itself is of a prescribed size (size that can be used as an electrode), it can be used as an electrode plate as is.

When an anode formed from scrap containing conductive oxide and a cathode formed from scrap containing conductive oxide are energized and electrolysis is commenced, oxygen gas will be generated in the anode of the scrap containing conductive oxide, and metals as the constituent component elements of the conductive oxide will start to dissolve respectively (for instance, with ITO, ITO→$In^{2+}$+$Sn^{2+}$).

The respective metals configuring the dissolved conductive oxide will be precipitated in the electrolyte as hydroxide. Although the amount of dissolution at the initial stage of electrolysis will be roughly 10 to 50% as the current efficiency, sludge will start to appear on the surface of the scrap containing conductive oxide, the amount of dissolution will gradually decrease, and will ultimately stop dissolving.

The reason for this is not necessarily clear, but it is assumed that the conductive property of the conductive oxide is lost due to the oxygen defect caused by the generation of oxygen gas in the anode, the scrap containing conductive oxide itself is no longer energized, and can no longer assume the role as an anode electrode. In any case, the dissolution of the scrap containing conductive oxide will not progress under the foregoing circumstances, and electrolysis will become difficult. However, if the sludge can be effectively eliminated from the scrap containing conductive oxide, it will be possible to dissolve such scrap containing conductive oxide.

Meanwhile, hydrogen gas is generated together with the commencement of energization in the cathode of the scrap containing conductive oxide, the scrap containing conductive oxide is subject to hydrogen reduction, and becomes the metal of the constituent substance. For example, with ITO, it will become indium-tin metal (ITO+$H_2$→In—Sn metal+ $H_2O$). The generation of hydrogen is caused by the electrolysis of water ($H_2O$→½ $H_2$+$OH^-$). The metal of such constituent substance (for instance, indium-tin metal) is created on the cathode surface of the scrap containing conductive oxide.

Nevertheless, if the energization time becomes long, the process will stop at the stage where slightly thick metal of the constituent substance is formed on the cathode of the scrap containing conductive oxide, and sponge-shaped metal suboxide will merely be formed below the metal surface layer, and the reduction will not progress any further.

The primary reason that the progress of electrolysis is obstructed is considered to be that the metal surface layer is inhibiting the infiltration of hydrogen, and current only flows to the metal surface layer and the flow of current inside the highly-resistant scrap containing conductive oxide is inhibited.

Under these circumstances, the targeted electrolysis will be inhibited in both the anode and cathode of the scrap containing conductive oxide. Here, the polarity of the anode and the polarity of the cathode of the scrap containing conductive oxide are inverted. This is a highly important process.

The metal that was accumulated on the surface of the new anode (old cathode) will dissolve. Since the electrolyte is retained in a neutral region, it will precipitate as hydroxide. The precipitate obtained thereby can be recovered as hydroxide. For instance, in the case of ITO, the primary reaction formula will be (In—Sn→$In^{3+}$+$Sn^{2+}$→$In(OH)_3$+$Sn(OH)_2$).

Although the generation of trace amounts of oxygen is acknowledged in the new anode, the amount is minimal. The new anode is also fraught with the dissolution of metal from the suboxide. This is also considered to precipitate as hydroxide.

Meanwhile, with the new cathode (old anode), the passivated sludge is reduced with the hydrogen generated on the cathode surface and becomes metal of the constituent substance.

Nevertheless, if this status is continued, the new anode will once again be passivated, only the surface layer of the new cathode will be subject to metalation, and the electrolysis will stop progressing. The polarity is converted once again before falling into this kind of state. By repeating this process, precipitation of hydroxide can constantly be promoted.

As a result of adopting this process of periodically inverting the electrodes, the gas generated in the electrode, that is, the generation of hydrogen and oxygen will be reduced significantly in comparison to cases of using either the anode or cathode as a fixed electrode. This implies that the generated gas is being effectively consumed for oxidation and reduction.

The conversion of polarity of the anode and cathode is a means for improving the recovery efficiency, and the voltage is used as the index thereof. Thus, the timing of inverting the polarity can be set according to the detection of the rise in voltage. Since the constantly optimal condition for the timing of inversion can be understood once the equipment is fixed, the polarity may also be inverted at certain timing.

Moreover, according to the experiments conducted, it is preferable to invert the polarity of the anode and cathode in 1 minute to 10 minute cycles. However, the timing of inverting the polarity is also a condition that may be arbitrarily changed according to the capacity of the electrolytic bath, amount of scrap containing conductive oxide, current density, voltage, current, type of electrolyte.

EXAMPLES

The present invention is now explained in detail with reference to the Examples. These Examples are merely illustrative, and the present invention shall in no way be limited thereby. In other words, various modifications and other embodiments based on the technical spirit claimed in the claims shall be included in the present invention as a matter of course.

Example 1

The amount of 90 g plate-shaped mill ends (scrap) of ITO (indium oxide-tin oxide), 20 mm(width)×100 mm(length)×6 mm(thickness) was used as the raw material. The components in this raw material were 9.8 wt % of tin oxide ($SnO_2$), and the remainder indium oxide ($In_2O_3$).

The raw material was used as the anode and cathode, and electrolysis was performed using 1 L of electrolyte containing 70 g/L of sodium sulfate, pH of 4.0, and electrolysis temperature of 25° C. The voltage was fixed at 10V, and the time of energization (polarity conversion at a cycle of 5 minutes×12) was 60 minutes (1 hour) in total. The current was changed from 2.95 A (start) to 1.2 A (end) in 5 minutes.

Consequently, the ITO mill ends showed a reduction of 4.2 g. A mixture of indium hydroxide and tin hydroxide precipitated in the electrolytic bath. It was thereby possible to obtain approximately 4.5 g (In quality level of 69 wt %) of indium hydroxide and approximately 0.4 g (Sn quality level of 7.7 wt %) of tin hydroxide. Purity of the mixture of indium hydroxide and tin hydroxide was the same as the purity of the scrap.

Incidentally, as a result of performing electrolysis in Example 1 upon switching the pH condition to pH 11.5 and pH 0.5, only trace amounts of indium ions and tin ions existed in the solution and it was not possible to obtain productive hydroxide. Since indium-tin metal will merely exist on the surface of the cathode side in the end, it could be said that it is desirable to set the pH within the range of 1.0 and 11 in order to improve the production yield.

Example 2

The mixture of indium hydroxide and tin hydroxide obtained as described above was further roasted at 150° C. in order to obtain a mixture of In oxide ($In_2O_3$) and Sn oxide ($SnO_2$). This mixture was roughly 4.1 g. The ratio obtained with this method was generally 90 wt % of $In_2O_3$ and 9.7 wt % of $SnO_2$, and was usable as the raw material of recycled ITO.

Example 3

The mixture of indium hydroxide and tin hydroxide obtained with electrolysis according to the method of Example 1 was further subject to acid leaching with sulfuric acid to obtain a solution of indium and tin, this solution was adjusted to pH 2.0 to eliminate tin as tin hydroxide, and indium was further subject to electrowinning under the conditions of electrolysis temperature of 30° C. and current density of 2 A/dm$^2$.

As a result of the foregoing process, it was possible to recover approximately 3 g of valuable metal, In, from an ITO scrap.

Example 4

ITO mill ends equivalent to Example 1 were used as the anode and cathode, 100 g/L of sodium nitrate solution was used as the electrolyte, pH was set to 10, and, with the other conditions being the same as Example 1, electrolysis was performed. Consequently, indium hydroxide and metastannic acid were obtained. The recovered amount and purity in this case were equivalent to Example 1.

Example 5

Under the conditions of Example 1, the amount of current was fixed at 2 A, and the setting was configured such that the polarity is inverted when the voltage reaches by or higher (the other conditions were the same as Example 1). The amount of accumulated current was also set to be the same as Example 1. Consequently, indium hydroxide and metastannic acid were obtained. The recovered amount and purity in this case were equivalent to Example 1.

Example 6

Under the conditions of Example 1, the cycle was changed to 1 minute and 10 minutes, and, with the other conditions being the same as Example 1, electrolysis was performed. Consequently, approximately 4 g (In quality level of 69 wt %) of indium hydroxide and approximately 0.4 g (Sn quality level of 7.7 wt %) of tin hydroxide were obtained. Purity of the mixture of indium hydroxide and tin hydroxide was the same as the purity of the scrap.

Example 7

The amount of 100 kg ITO scraps were respectively placed in an anode box and a cathode box, and electrolysis was performed with 70 g/L of sodium sulfate as the electrolyte, pH of 10.5, inversion cycle of 5 minutes, and amount of accumulated current of 10000 AHr. The other conditions were the same as Example 1.

Consequently, approximately 13 kg of indium hydroxide and tin hydroxide were obtained. Purity of the mixture of indium hydroxide and tin hydroxide was the same as the purity of the scrap.

Example 8

Acid leaching was performed with sulfuric acid under the conditions of Example 3. When acid leaching was performed with nitric acid, however, only a solution of indium was obtained, and tin became metastannic acid and did not dissolve. As a result of performing electrowinning to the indium solution that was acid leached with nitric acid, 3 g of indium metal was obtained.

Comparative Example 1

ITO scraps equivalent to Example 1 were used and ITO was only used as the anode, and a titanium plate was used as the cathode. The amount of 70 g/L of Sodium sulfate was used as the electrolyte, and electrolysis was performed with pH of 4.5 for 60 minutes. The total amount of the obtained indium and tin oxide was 0.4 g, and the recovered amount was significantly smaller in comparison to Example 1.

Comparative Example 2

ITO scraps (mill ends) equivalent to Example 1 were used as the raw material, ITO was only used as the cathode, and insoluble carbon was used as the anode. Sodium sulfate was used as the electrolyte as with Example 1, and, with the other conditions being the same as Example 1, electrolysis was performed. Consequently, approximately 0.5 g of indium-tin metal could only be obtained on the surface of the ITO scraps (mill ends). The yield was significantly inferior in comparison to the Examples.

Although each of the Examples 1 to 8 used ITO (indium oxide-tin oxide) mill ends or scraps in which the components thereof were 9.7 wt % of tin oxide ($SnO_2$) and the remainder indium oxide ($In_2O_3$), it is obvious that the electrolytic conditions such as the current density and pH can be arbitrarily changed according to the component amount of $In_2O_3$ and $SnO_2$, and there is no reason to be particularly limited by the component amount of the raw material. In particular, with ITO, the content of tin oxide ($SnO_2$) can be changed from 5 wt % to 30 wt %, and the present invention can also be sufficiently applied in the foregoing cases.

In addition, although there are cases where small amounts of accessory components are added to the ITO, as long as ITO is the basic constituent, it is obvious that the present invention can also be applied to this case.

Examples other than ITO are now explained.

Example 9

Scrap to be Recovered: IGZO (In—Ga—Zn—O Composite Oxide)

Using IGZO plate-shaped mill end scraps as the electrode, electrolysis was performed using 1 L of electrolyte containing 70 g/L of sodium sulfate, pH of 9, and temperature of 20° C. Electrolysis was performed by periodically converting the polarity (cathode→anode→cathode . . . ) when the voltage reached 10V. Thus, hydroxides of In, Ga, and Zn were obtained. The production yield was 98%.

Next, a normally employed wet method (acid leaching→solvent extraction →electrolysis, etc.) was used to recover metals or oxides of In, Ga, and Zn.

As described above, with IGZO (In—Ga—Zn—O composite oxide) having conductive property, it was possible to efficiently recover valuable resources (metal).

Example 10

Scrap to be Recovered: ZnO

Using ZnO plate-shaped mill end scraps as the electrode, electrolysis was performed using electrolyte containing 50 g/L of ammonium sulfate, pH of 10, and temperature of 50° C. Electrolysis was performed by periodically converting the polarity when the voltage reached 15V. Consequently, hydroxide of Zn was obtained. The production yield was 99.5%. The purity was the same as the starting material (purity of the raw material).

As a result of subjecting this hydroxide once again to desiccation and sintering, it was usable as a ZnO target. As described above, it was possible to efficiently recover ZnO as an oxide with conductive property.

Example 11

Scrap to be Recovered: $ZnO$—$SnO_2$

Using $ZnO$—$SnO_2$ mill end scraps as the electrode, electrolysis was performed using electrolyte containing 100 g/L of sodium sulfate, pH of 9, and electrolysis temperature of 70° C.

During the electrolysis, the polarity was periodically inverted every 5 minutes. Consequently, hydroxides of Zn and Sn were obtained. The production yield was 99.0%. As described above, it was possible to efficiently recover $ZnO$—$SnO_2$ (conductive oxide) as the hydroxides of Zn and Sn.

Example 12

Scrap to be Recovered: $SnO_2$ $SnO_2$ mill end scraps were subject to electrolysis in a 70 g/L of sodium sulfate solution, pH of 2, and electrolysis temperature of 30° C. Electrolysis was performed by periodically inverting the polarity every 10 minutes. Consequently, hydroxide of Sn was obtained. The production yield was 99.7%. As described above, it was possible to efficiently recover SnO2 (conductive oxide) as the hydroxide of Sn.

Example 13

Scrap to be Recovered: Co—In—O Composite Oxide

As with Example 9, electrolysis was performed with pH of 9 while periodically inverting the polarity to obtain hydroxide. The production yield was 97.0%.

As with Example 9, with the Co—In—O composite oxide having conductive property, it was possible to efficiently recover a valuable resource (metal) as hydroxide.

Example 14

Scrap to be Recovered: Ni—Sn—O Composite Oxide

As with Example 9, electrolysis was performed with pH of 7 while periodically inverting the polarity to obtain hydroxide. The production yield was 97.7%.

As with Example 9, with the Ni—Sn—O composite oxide having conductive property, it was possible to efficiently recover a valuable resource (metal) as hydroxide.

Example 15

Scrap to be Recovered: Cu—Ga—O Composite Oxide

As with Example 9, electrolysis was performed with pH of 9 while periodically inverting the polarity to obtain hydroxide. The production yield was 99.1%.

As with Example 9, with the Cu—Ga—O composite oxide having conductive property, it was possible to efficiently recover a valuable resource (metal) as hydroxide.

Example 16

Scrap to be Recovered: Pb—Sn—O Composite Oxide

As with Example 9, electrolysis was performed with pH of 10 while periodically inverting the polarity to obtain hydroxide. The production yield was 99.5%.

As with Example 9, with the Pb—Sn—O composite oxide having conductive property, it was possible to efficiently recover a valuable resource (metal) as hydroxide.

Example 17

Scrap to be Recovered: Cd—Zn—O Composite Oxide

As with Example 9, electrolysis was performed with pH of 7 while periodically inverting the polarity to obtain hydroxide. The production yield was 98.1%.

As with Example 9, with the Cd—Zn—O composite oxide having conductive property, it was possible to efficiently recover a valuable resource (metal) as hydroxide.

Example 18

Scrap to be Recovered: Ga—Cu—O Composite Oxide

As with Example 9, electrolysis was performed with pH of 10 while periodically inverting the polarity to obtain hydroxide. The production yield was 99.6%.

As with Example 9, with the Ga—Cu—O composite oxide having conductive property, it was possible to efficiently recover a valuable resource (metal) as hydroxide.

Example 19

Scrap to be Recovered: Sb—In—O Composite Oxide

As with Example 9, electrolysis was performed with pH of 8 while periodically inverting the polarity to obtain hydroxide. The production yield was 98.7%.

As with Example 9, with the Sb—In—O composite oxide having conductive property, it was possible to efficiently recover a valuable resource (metal) as hydroxide.

Example 20

Scrap to be Recovered: Fe—Ge—O Composite Oxide

As with Example 9, electrolysis was performed with pH of 7 while periodically inverting the polarity to obtain hydroxide. The production yield was 96.7%.

As with Example 9, with the Fe—Ge—O composite oxide having conductive property, it was possible to efficiently recover a valuable resource (metal) as hydroxide.

Example 21

Scrap to be Recovered: Pd—Sn—O Composite Oxide

As with Example 9, electrolysis was performed with pH of 7 while periodically inverting the polarity to obtain hydroxide. The production yield was 99.8%.

As with Example 9, with the Pd—Sn—O composite oxide having conductive property, it was possible to efficiently recover a valuable resource (metal) as hydroxide.

Example 22

Scrap to be recovered: Ti—In—O Composite Oxide

As with Example 9, electrolysis was performed with pH of 7 while periodically inverting the polarity to obtain hydroxide. The production yield was 93.7%.

As with Example 9, with the Ti—In—O composite oxide having conductive property, it was possible to efficiently recover a valuable resource (metal) as hydroxide.

As shown in Examples 9 to 24 described above, even when using scraps of conductive oxides other than ITO, valuable metal can be efficiently recovered from the scrap containing conductive oxide as hydroxide or a mixture of hydroxide and subhydroxide by changing the polarity.

The method provided by the present invention is superior, since recovering valuable metal from scrap containing conductive oxide, such scraps as a sputtering target scrap containing conductive oxide or a scrap as mill ends of conductive oxide that arise during the production of such a sputtering target is simply subject to electrolysis as the anode and cathode, it is very easy to efficiently recover valuable metal as hydroxide or a mixture of hydroxide and subhydroxide, or as metal oxide or a mixture of metal oxides and various metal oxides.

Moreover, the recovery of valuable metal from scrap containing conductive oxide according to the present invention enables to maintain the purity without change if the scrap containing conductive oxide to be subject to electrolysis is in itself scrap of a high purity material, and the scrap can be recovered as high purity hydroxide or a mixture of hydroxide and subhydroxide, or a mixture of metal oxides or various metal oxides. This is a significant advantage of the present invention.

The present invention yields superior effects of saving complicated processes and the process of eliminating impurities mixed in during production as in the past, enabling to increase the production efficiency and recover high purity valuable metal. Thus, the present invention is highly useful as a method of recovering valuable metal from scrap containing conductive oxide.

The invention claimed is:

1. A method of recovering metal from scrap containing conductive oxide, comprising the steps of:
    performing electrolysis in electrolyte with electrodes of scrap containing conductive oxide forming an anode and a cathode;
    during said step of performing electrolysis, dissolving metal of the anode within the electrolyte and precipitating the metal dissolved in the electrolyte as hydroxide;
    during said step of performing electrolysis, periodically inverting polarity of the anode and the cathode such that said dissolving and precipitating steps are continually promoted during said step of performing electrolysis; and
    recovering the metal precipitated as hydroxide.

2. The method of recovering metal from scrap containing conductive oxide according to claim 1, wherein said step of inverting polarity occurs before said dissolving step ceases due to the anode becoming passivated.

3. The method of recovering metal from scrap containing conductive oxide according to claim 1, wherein said step of inverting polarity occurs before hydrogen reduction of the cathode ceases.

4. The method of recovering metal from scrap containing conductive oxide according to claim 1, wherein said step of inverting polarity occurs before said dissolving step ceases due to the anode becoming passivated and before hydrogen reduction of the cathode ceases so that said dissolving and precipitating steps occur continuously throughout said step of performing electrolysis.

5. The method of recovering metal from scrap containing conductive oxide according to claim 1, further comprising a step of detecting voltage across the anode and cathode and performing said step of reversing polarity each time the voltage detected rises to a predetermined value.

6. The method of recovering metal from scrap containing conductive oxide according to claim 1, wherein the scrap containing conductive oxide is a substance that can be reduced to metal or suboxide with hydrogen.

7. The method of recovering metal from scrap containing conductive oxide according to claim 1, wherein the scrap containing conductive oxide is selected from the group consisting of ITO, In—Ga—Zn—O composite oxide, ZnO, ZnO—$SnO_2$, $SnO_2$, Co—In—O composite oxide, Ni—Sn—O composite oxide, Cu—Ga—O composite oxide, Pb—Sn—O composite oxide, Cd—Zn—O composite oxide, Sb—In—O composite oxide, Fe—Ge—O composite oxide, and Ti—In—O composite oxide.

* * * * *